(12) United States Patent
Fernandez Moral et al.

(10) Patent No.: US 12,541,010 B2
(45) Date of Patent: Feb. 3, 2026

(54) RAILWAY VEHICLE PROVIDED WITH LIDAR DEVICES

(71) Applicant: HITACHI RAIL STS S.P.A., Naples (IT)

(72) Inventors: Eduardo Fernandez Moral, Buckinghamshire (GB); Alexander Paradzinets, Buckinghamshire (GB); Heiko Niermann, Ergolding (DE); Anthony Ohazulike, Buckinghamshire (GB); Massimiliano Lenardi, Buckinghamshire (GB); Giuseppe Graber, Naples (IT); Francesco Canora, Naples (IT); Gaetano D'Andria, Naples (IT); Luigi Fratelli, Naples (IT); Gavino Lace, Naples (IT)

(73) Assignee: HITACHI RAIL STS S.P.A., Naples (IT)

(\*) Notice: Subject to any disclaimer, the term of this patent is extended or adjusted under 35 U.S.C. 154(b) by 980 days.

(21) Appl. No.: 17/709,892

(22) Filed: Mar. 31, 2022

(65) Prior Publication Data
US 2022/0317263 A1   Oct. 6, 2022

(30) Foreign Application Priority Data

Mar. 31, 2021 (IT) .................. 102021000008069

(51) Int. Cl.
| | | |
|---|---|---|
| G01S 7/481 | (2006.01) | |
| G01S 17/42 | (2006.01) | |
| G01S 17/89 | (2020.01) | |
| G01S 13/931 | (2020.01) | |

(52) U.S. Cl.
CPC .......... *G01S 7/4817* (2013.01); *G01S 7/4813* (2013.01); *G01S 17/42* (2013.01); *G01S 17/89* (2013.01); *G01S 2013/9328* (2013.01)

(58) Field of Classification Search
CPC ...... G01S 7/4817; G01S 7/4813; G01S 17/42; G01S 17/89; G01S 2013/9328; G01S 2013/9315; G01S 2013/93271; G01S 17/87; G01S 17/931; B61L 23/041
USPC ........................................................ 356/4.01
See application file for complete search history.

(56) References Cited

U.S. PATENT DOCUMENTS

| | | | | |
|---|---|---|---|---|
| 10,908,291 B2* | 2/2021 | Mesher | ................... | G01S 17/86 |
| 11,548,541 B2* | 1/2023 | Moth | .................... | B61L 23/042 |
| 2018/0372875 A1 | 12/2018 | Juelsgaard et al. | | |

FOREIGN PATENT DOCUMENTS

WO    2020/180707 A1    9/2020

OTHER PUBLICATIONS

Italian Search Report and Written Opinion in IT Application No. 202100008069, mailed Jan. 5, 2022, an English Translation attached herewith (7 pages).

\* cited by examiner

*Primary Examiner* — Daniel L Murphy
(74) *Attorney, Agent, or Firm* — Leason Ellis LLP

(57) ABSTRACT

A railway vehicle has two side walls facing each other to define a passenger compartment and a front end portion, which has two LIDAR devices arranged at the upper side corners of the front end portion; each of the LIDAR devices has a field of view of 360° about its axis, and such axis is oriented with a forward inclination and with a lateral outward inclination.

10 Claims, 8 Drawing Sheets

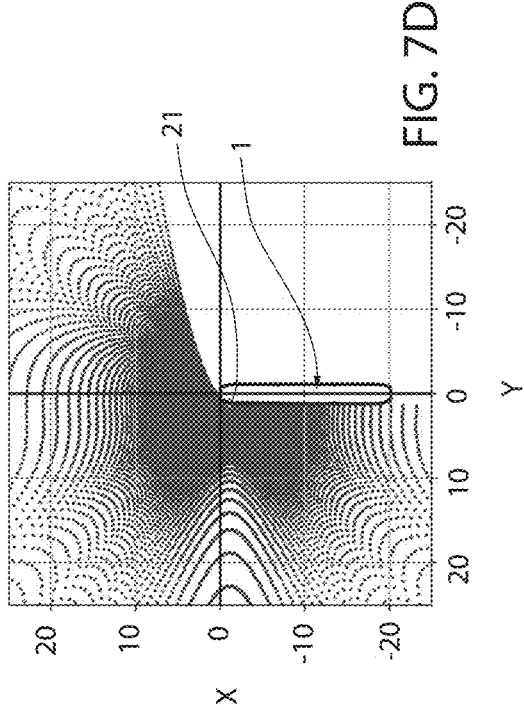
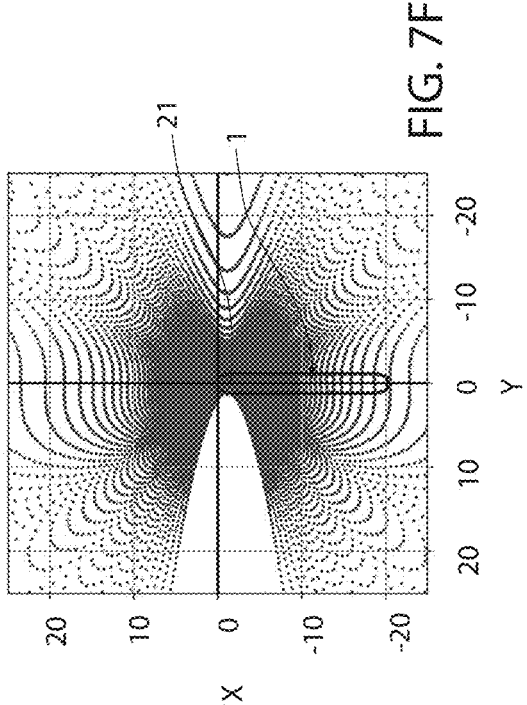
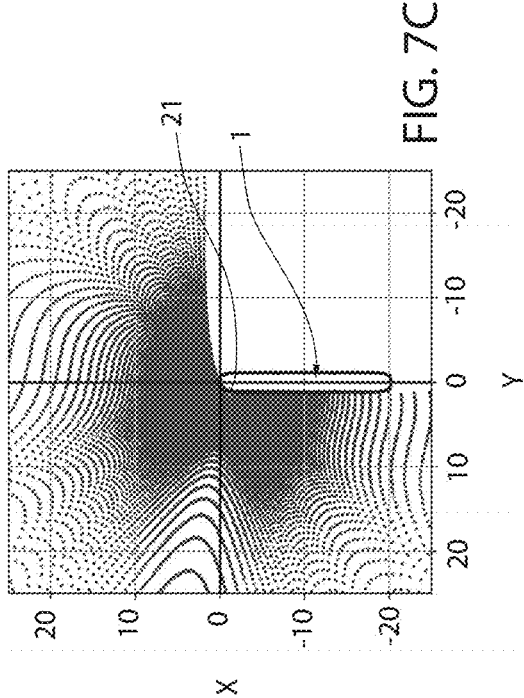
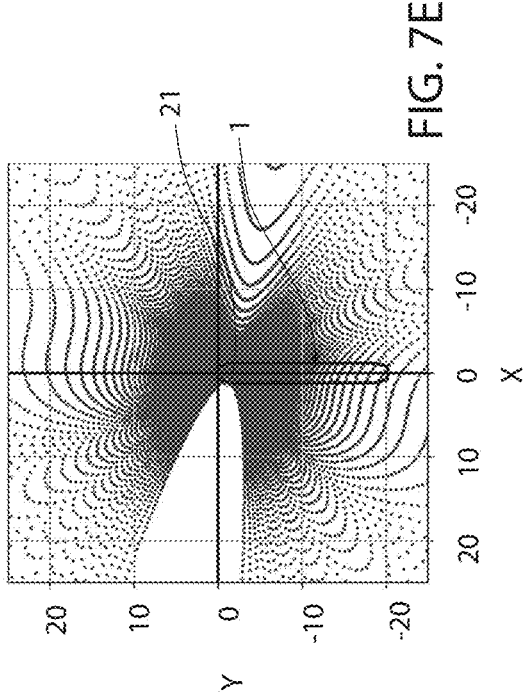
FIG. 7C
FIG. 7D
FIG. 7E
FIG. 7F

RAILWAY VEHICLE PROVIDED WITH LIDAR DEVICES

CROSS-REFERENCE TO RELATED APPLICATIONS

This Patent Application claims priority from Italian Patent Application No. 102021000008069 filed on Mar. 31, 2021, the entire disclosure of which is incorporated herein by reference.

TECHNICAL FIELD

This invention relates to a railway vehicle, equipped with LIDAR devices used to assist a driver in driving the vehicle and/or used to enable autonomous driving. The invention specifically relates to a railway vehicle equipped with a LIDAR assembly having a particularly advantageous arrangement in order to maximizing the field of view (FoV) of such LIDAR devices.

BACKGROUND ART

As it is well known, in relation to driving vehicles, so-called "dead spots" or "blind spots" can occur, i.e. the driver may not be able to correctly identify the external environment in certain areas of his/her FoV, or may have some difficulties in interpreting what he/she visually perceives. These difficulties are present, for example, when the windscreen and the side windows of the vehicle are relatively small and/or when there is particular crowding of people or objects in the proximity of the vehicle, and/or when the driver's driving cabin is placed in an unfavourable position for an optimal view of the external surroundings.

In particular, in vehicles used for public passenger transport, such as trams, trains, metro or buses, the driver's driving cabin is located at the front end of the vehicle and is relatively high in relation to the road surface and in relation to the platforms provided for the boarding and alighting of people along the public transport line. In practice, it is rather difficult to perceive a clear view of the side areas near the side doors of the vehicle: these areas cannot be viewed by traditional cameras installed on the vehicle and aimed to monitor the boarding and alighting of passengers. Furthermore, it is rather difficult to perceive a clear view of the areas that are arranged at the bottom of the front corners of the vehicle, i.e. at the side ends of the front bumper.

For safety reasons, therefore, there is a need to provide scanning and/or detection devices that can be fitted to the vehicle in a relatively simple way, without requiring a new design of the bodywork, and can help the driver to detect and recognise any objects or people in critical areas. This need is particularly felt when the vehicle is at a standstill at a public transport stop, and the driver has to start for reaching a next stop.

In order to meet this need, the technology known by the acronym "LIDAR" (i.e., in English, "Light Detection and Ranging" or "Laser Imaging Detection and Ranging") is used in the automotive field: it makes it possible to scan the surrounding areas and obtain three-dimensional cloud points, in which objects can be detected.

In general, two main kinds of LIDARS are known, and they are chosen and used according to their FoV.

According to the first kind, named also as "front type" LIDAR, it scans a limited three dimensional angular sector, and it is used for acquiring information from a front scene at relatively long distances. According to technological and eye-safety regulation limits, angular resolution and maximum scanning distance are inversely proportional. In fact, when this kind of LIDAR is chosen for scanning a relatively large desired area, a relatively high number of devices is often needed so as to achieve the desired overall FoV, with an overlap between the cloud points produced by such LIDAR devices so as to increase the resolution of the scanned overall scene.

According to the second kind, the LIDAR scans over a 360° angle around a symmetry axis, but it has a rather limited scanning distance. These known LIDAR devices, for scanning over a 360° angle, usually include a sensor head with a substantially cylindrical shape. In the automotive field, they are usually placed on the roof of a car, usually near its center, to scan the space around such car. In this kind of solutions, the LIDAR device gives an overall view of the surrounding scene, but it suffers from "blind spots" all around the vehicle, because of a shadow in the scanned area caused by the car roof, and because of the naturally limited FoV of the device along the vertical direction.

On the basis of these considerations, and within this technology, there is a need to refine the known arrangements in order to optimally adapt the LIDAR devices to passenger transport vehicles, and in particular to railway vehicles (e.g. trams, and light-rail trains designed to travel above the ground), in order to completely or partially remove the "blind spots" and achieve information about presence of possible obstacles around the vehicle, and near the vehicle itself (e.g. near the sidewalls, the side doors, the bumper, etc.), and also to achieve an arrangement capable, at the same time, to scan the scene in front and at the sides of the vehicle, and at the same time at the rails and at the catenary height, by mounting the lowest number of LIDAR devices as possible.

DISCLOSURE OF INVENTION

The aim of the present invention is to provide a railway vehicle, equipped with LIDAR devices, which allows the above mentioned needs to be met in a simple and economical way. According to this invention, a railway vehicle is provided, as defined in claim 1.

BRIEF DESCRIPTION OF THE DRAWINGS

The invention will now be described with reference to the annexed drawings, which show a non-limiting embodiment, and in which.

BEST MODE FOR CARRYING OUT THE INVENTION

Figure 2:
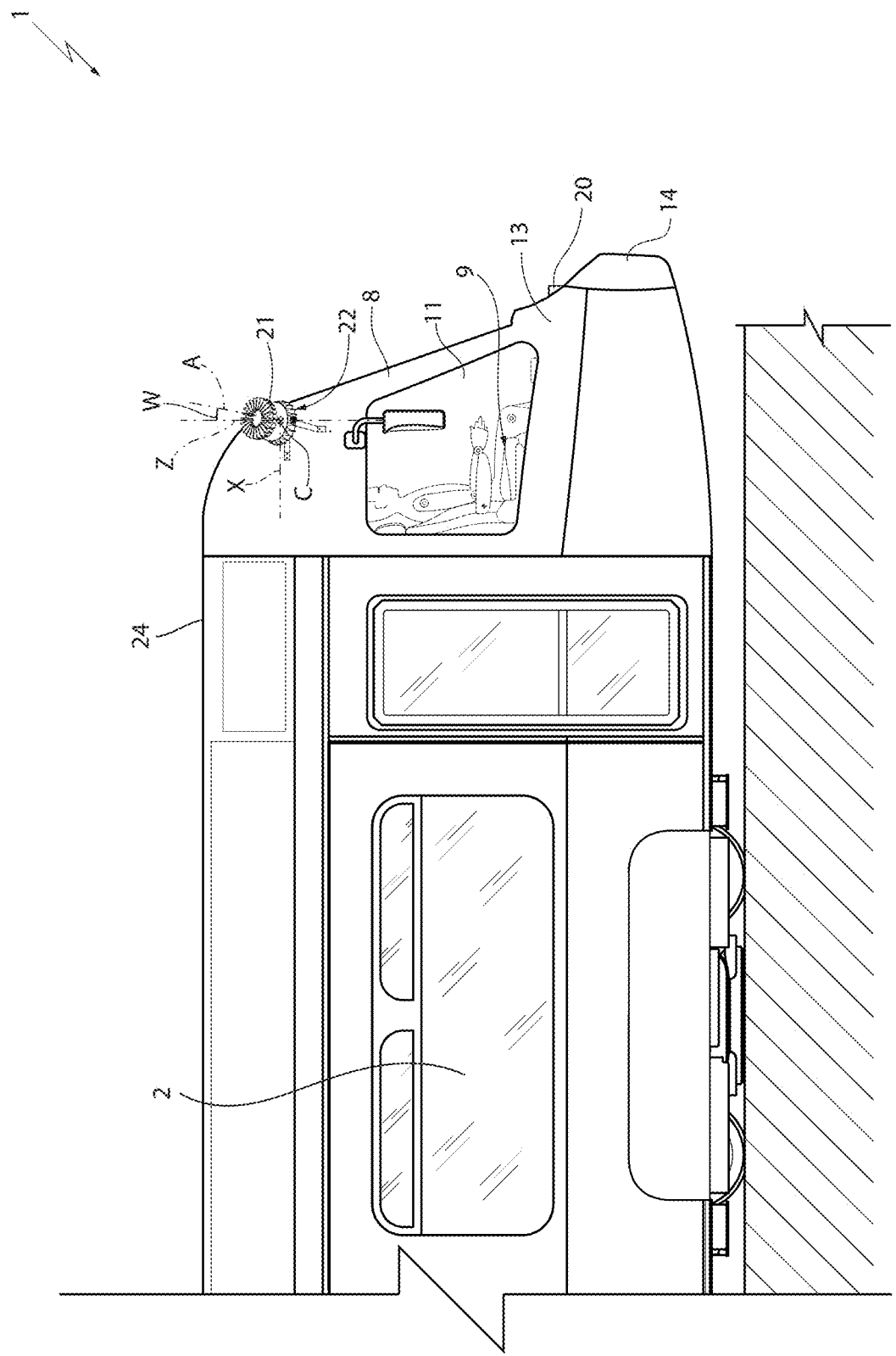

In FIG. 2, the reference number 1 indicates, as a whole, a vehicle (partially shown) having a passenger compartment 2 for the transportation of passengers. The passenger compartment 2 has a height enough to ensure that passengers can walk on a platform or floor (not illustrated) of the passenger compartment 2: by way of example, vehicle 1 is defined by a tram, a train, an underground train, and the like. In particular, during use, vehicle 1 runs on a public transport line or route, along which stops or stations are provided. In general, vehicle 1 is defined by a railway vehicle.

Figure 3:
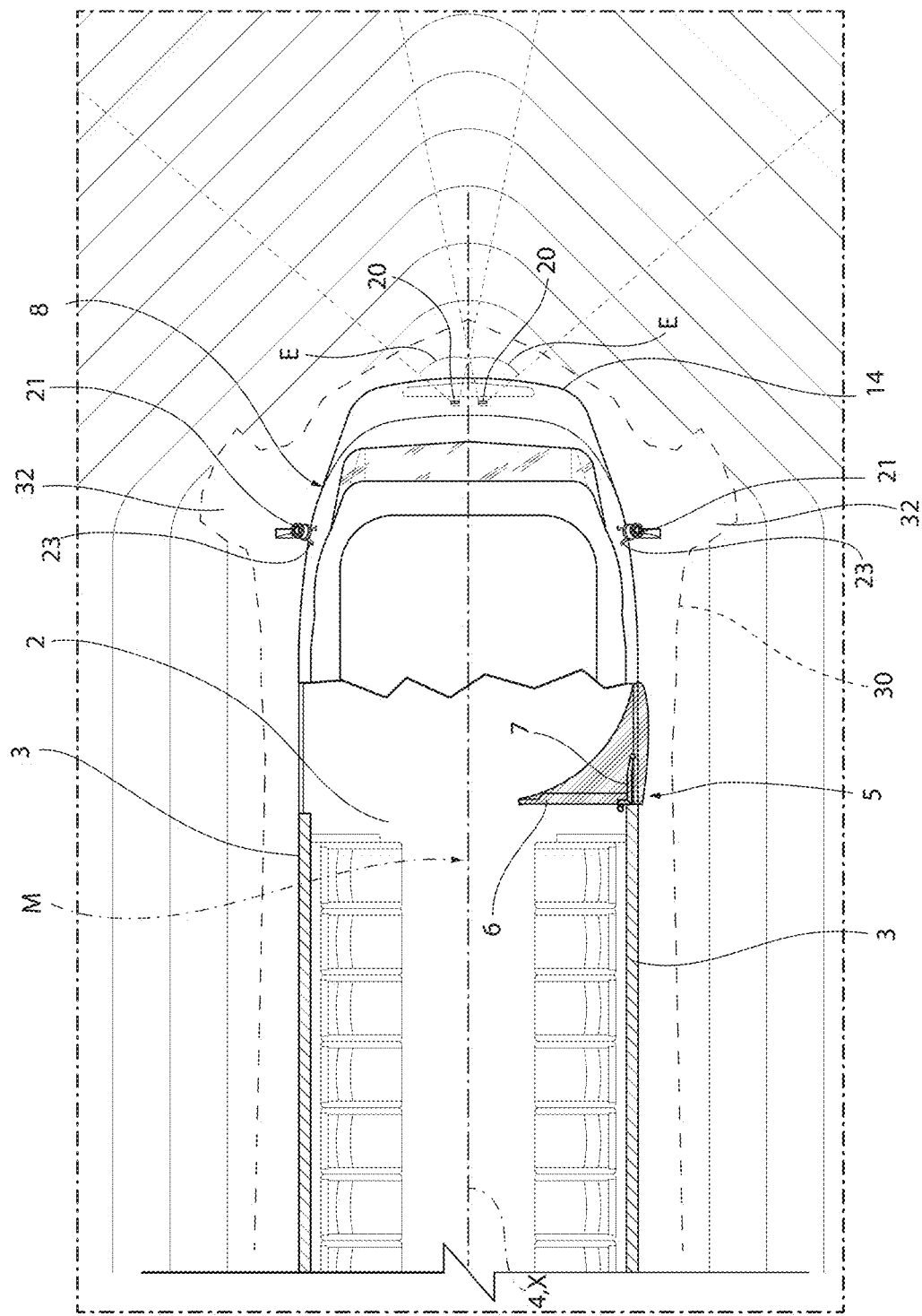

With reference to FIG. 3, vehicle 1 comprises two side walls 3 which extend parallel to a longitudinal axis 4 and face each other so as to define the passenger compartment 2. At least one of the side walls 3 has one or more openings 5 for passenger boarding and alighting, with respective doors 6, each of which consists of a single wing, for instance, and is movable between an open and a closed position (not shown) under the action of a known type actuator device 7.

With reference to FIG. 2, vehicle 1 ends longitudinally with a front portion 8 which, in the example shown, is defined by a cabin housing a driver's seat 9. In particular, the cabin is, at least in part, separated from the passenger compartment 2, in a known manner. According to a variant that is not shown, vehicle 1 is without the cabin and/or without driver's seat 9, as vehicle 1 is equipped with autonomous driving systems and/or remote driving systems.

According to the preferred solution shown in the drawings, the front portion 8 has one or more transparent windows 11, which allow the outside environment to be seen by the driver from the inside of vehicle 1. For example, windows 11 comprise a windscreen and one or more side windows.

The front portion 8 comprises a lower front wall 13 carrying a bumper 14, which has shape, structure and position such as to ensure safety in the event of a front impact against obstacles. In particular, an energy absorption device is provided at the bumper 14. At the front corners of the vehicle 1, i.e. at the side ends of bumper 14, such wall 13 is joined to the side walls 3, as shown from the top plan view in FIG. 3, so as to give portion 8 an external profile that is tapered and/or rounded at the corners between walls 13 and 3.

Figure 1:
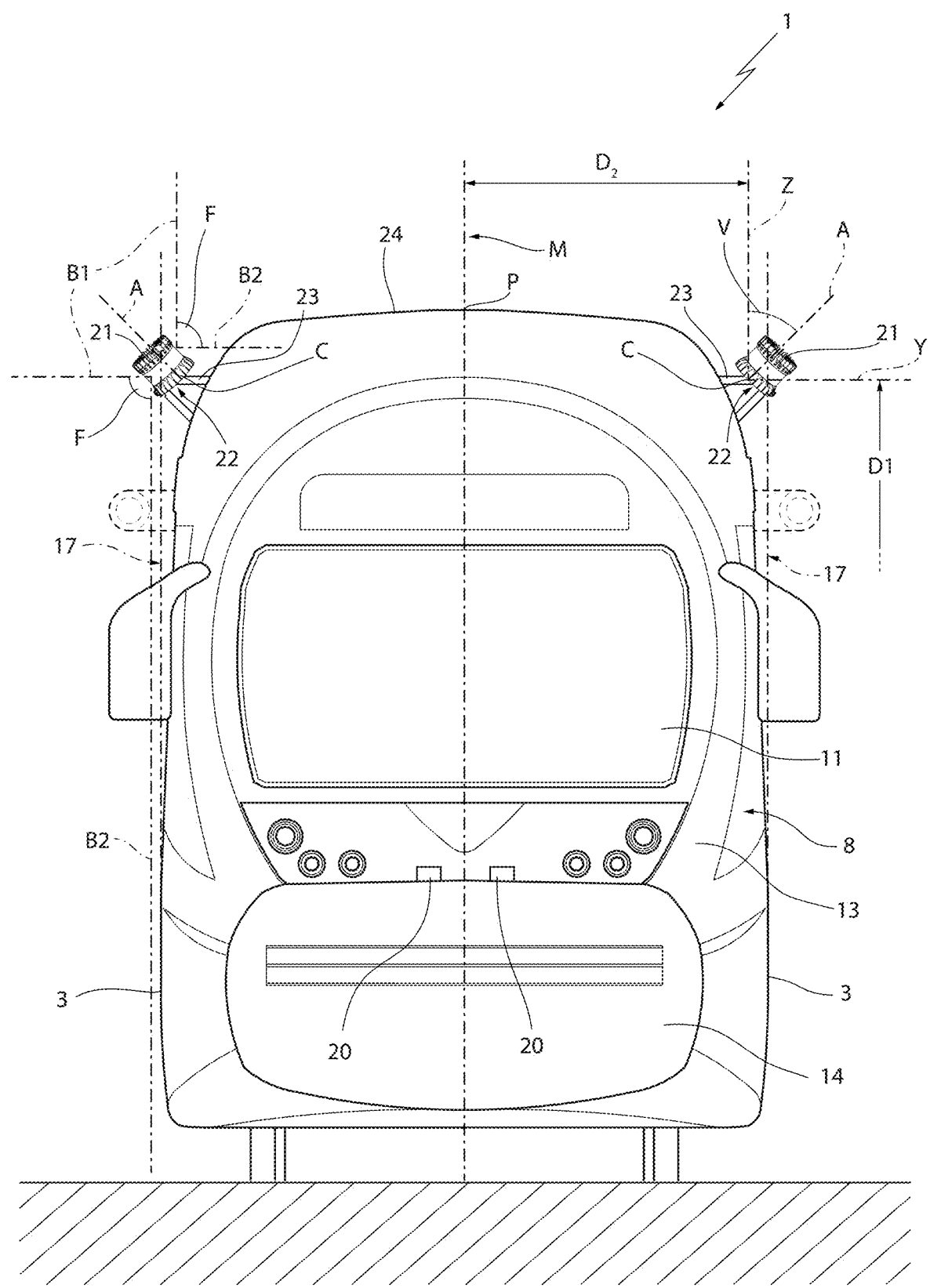
FIGS. 1 to 3 are, respectively, a front view, a side view and a top plan view showing, partially, a preferred embodiment of the railway vehicle equipped with LIDAR devices according to the present invention.

As it can be seen from the front view of vehicle 1, in FIG. 1, at least a part of the side walls 3 extends longitudinally and vertically, i.e. tangent to a respective ideal vertical plane 17, parallel to axis 4. As mentioned, the side walls 3 laterally define the passenger compartment 2. The front portion 8 can comprise one or more external rearview mirrors and/or one or more external rearview cameras, which are supported by bodywork elements, e.g. by the interposition of frames, arms or brackets, or integrated in the bodywork.

In addition, the front portion 8 of vehicle 1 comprises a LIDAR assembly defined by no, one or two central LIDAR devices 20, arranged at the wall 13, and by two LIDAR devices 21 arranged at the upper side corners of the front portion 8. The LIDAR devices 20 and 21 make it possible, in a known manner, not described in detail, to identify obstacles, objects and/or people outside of the vehicle 1, in particular around the front portion 8 and in front of the side walls 3, in order to assist the driver in driving the vehicle 1 (whether he/she actually is in the cabin or is in a remote control station) or in order to provide input signals to an autonomous driving system of the vehicle 1.

Preferably, there are two LIDAR devices 20 arranged at the wall 13, at the same height, and next to one another along a horizontal direction orthogonal to the longitudinal axis 4. In particular, they are arranged in fixed positions above the bumper 14 (and below the windscreen, if provided). Each LIDAR device 20 has a vertical axis and is configured to scan a field of view (FoV) defined by an angle E lower than 180° (e.g. between 15° and 30°) about such vertical axis (i.e. according to a top plan view), as schematically shown in FIG. 3).

The FoV of the LIDAR devices 20 are symmetric to each other, with respect to a vertical centreline plane M, on which the longitudinal axis 4 lies, but anyway they could be arranged not symmetrically.

Preferably, each LIDAR device 20 with its FoV is not centered with respect to a longitudinal centreline that is parallel to the longitudinal axis 4 and extends through the LIDAR device 20: indeed, the orientation of each LIDAR device 20 about its vertical axis is slightly inclined outwardly (e.g. by an angle between 0° and 20°), so as to point the scanned FoV slightly towards a corresponding front side area. In any case, a certain overlap of the two FoVs is still present around the centreline plane M.

As far as the LIDAR devices 21 are concerned, they are carried by respective bodywork elements, are external to vehicle 1 and, preferably, are arranged in symmetrical positions with respect to the vertical centreline plane M.

Each of the LIDAR devices 21 extends along a respective straight axis A and is configured to detect and scan the external scene with a FoV wholly covering a 360° angle about the axis A. In the meantime, as schematically shown in FIG. 1, along a direction parallel to axis A each LIDAR device 21 is configured to scan a FoV between an upper boundary B1 (i.e. an upper conical surface) and a lower boundary B2 (i.e. a lower conical surface). The upper and lower boundaries B1, B2 of the FoV form a given scanning angle F (e.g. equal to) 90° between each other. In this regard, the intersection of the lines indicating the boundaries B1 and B2 is shown in approximate manner in FIG. 1: actually, the beams emitted by the LIDAR device 21 intersect each other at the same point, along axis A (around the centre of the LIDAR device).

In particular, the LIDAR devices 21 have a substantially cylindrical shape. More in particular, axis A extends orthogonally and upwards from the centre point C of a base surface 22 of the LIDAR device 21.

A connecting device 23 (defined e.g. by a frame, bracket or arm) supports each LIDAR device 21, e.g. its base surface 22, and connects such LIDAR device 21 to a corresponding bodywork element of the front portion 8.

In particular, LIDAR devices 21 are preferably mounted in an overhanging position, with respect to the external bodywork of the vehicle 1. However, the way in which LIDAR devices 21 are coupled may be different from what schematically shown as an example. In particular, the connecting device 23 can be designed in a different manner, as a function of weight, vehicle aesthetic design, vibration absorption requirements, cable hiding and protection, etc.

According to an aspect of the present invention, the axes A are oriented so that they have two kinds of inclination, so as to diverge from the vehicle roof 24. In order to define such inclinations and the arrangement of the LIDAR devices 21, the longitudinal axis of the vehicle is identified by the reference X, the vertical axis is identified by the reference Z (such axis Z being a direction orthogonal to the vehicle floor), and the transversal axis (orthogonal to axes X and Z) is identified by the reference Y. The X,Y,Z axis are in the left handed (or levorotatory) composition. Accordingly, axis X is orthogonal to plane YZ, axis Y is orthogonal to plane XZ, and axis Z is orthogonal to plane XY.

The first inclination is a lateral outwardly inclination. Indeed, when observing each LIDAR device 21 and the front portion 8 from a front point of view (FIG. 1), and considering the axis A as a half-line extending upwards from point C, you can see a projection of the axis A on a plane YZ: such projection is inclined outwardly, with an angle V, with respect to the axis Z.

The second inclination is a forward inclination. Indeed, when observing each LIDAR device 21 and the front portion 8 from a side point of view (FIG. 2), and considering the axis A as a half-line extending upwards from point C, you can see a projection of the axis A on a plane XZ: such projection is inclined forward, with an angle W, with respect to the axis Z.

Figure 9:
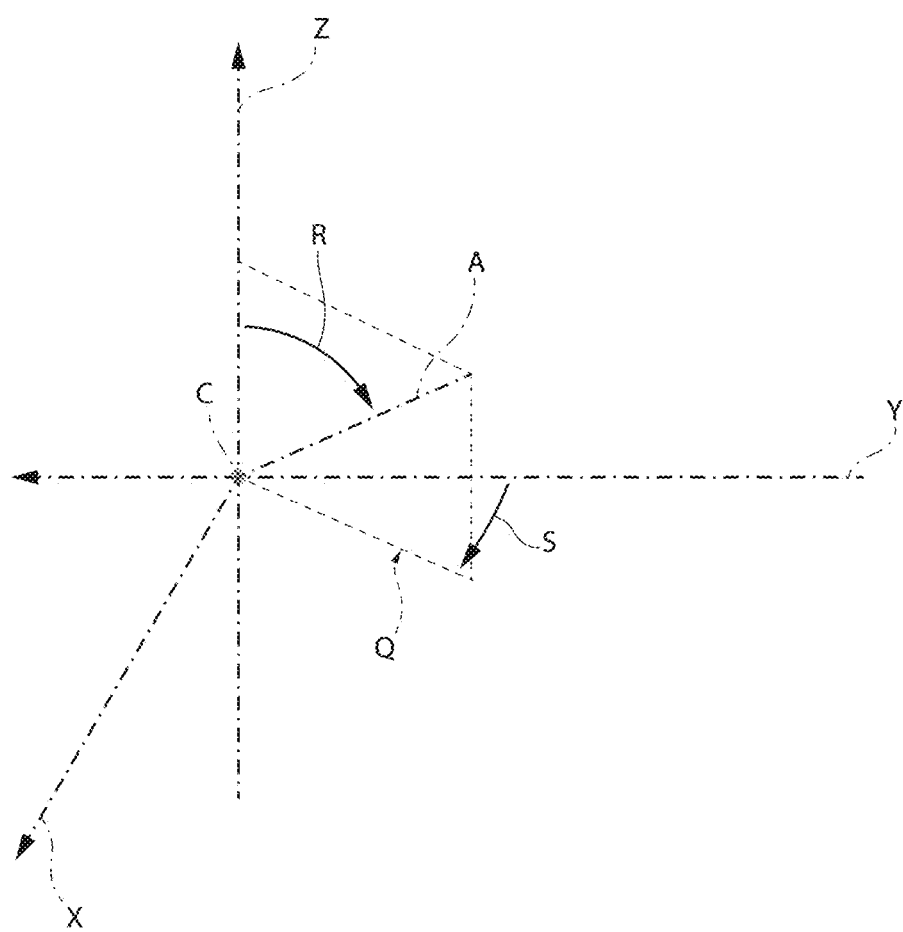
FIG. 9 schematically shows the inclinations of the LIDAR device axis.

The two inclinations of each LIDAR device 21 could be defined also in another manner, with reference to FIG. 9, considering that axis A lies on a vertical half-plane Q that extends outwardly from the axis Z:
 the axis A is inclined laterally outwardly by an angle R, measured in the half-plane Q with respect to the axis Z, and
 the half-plane Q, and accordingly the axis A, are inclined forward (i.e. towards the front end of the vehicle) about the axis Z by an angle S with respect to the plane YZ.

For instance, the angle R is approximately between 40° and 50°. This lateral outward inclination of the LIDAR device is useful to monitor the sides of the vehicle; in particular, the lateral outward inclination angle R is chosen in such a manner that the lower boundary B2 has a directrix line that is coincident or parallel to axis Z (with a possible error of ±5°). In other words, if the scanning angle F is symmetric with respect to a plane orthogonal to axis A:

$$R=(90°-F/2)$$

with a possible error of ±5°.

As far as the forward inclination is concerned, the angle S is between 0° and 45°, and preferably between 0° and 15°. The optimal angle value of the forward inclination can vary, depending on the vehicle design (e.g. the driver's cabin design) and on the relative position of the LIDAR devices 21 with respect to the front edge of the vehicle. Moreover, the values of the lateral and forward inclinations strongly depend on the amplitude (angle F) of the FoV of the LIDAR devices 21: in fact, by varying model or manufacturer, the FoV changes and thus the optimal inclination values can change.

Figure 6A:
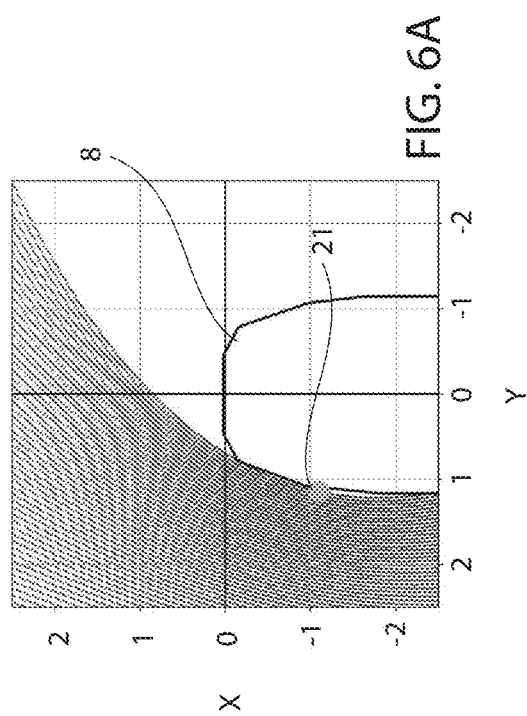
FIGS. 6A-8D compare the field of view (FoV) of a LIDAR device with and without a forward inclination.
Figure 6B:
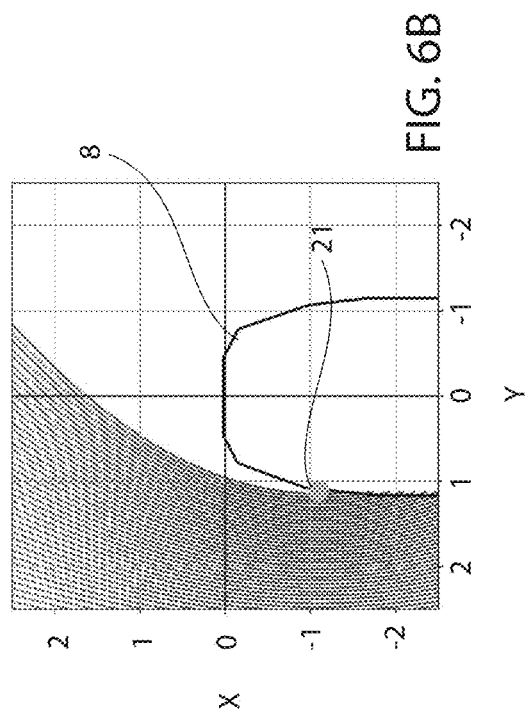

The forward inclination is useful to remove possible blind spots at the side ends of the bumper and in front of the bumper itself. This effect can be seen in FIGS. 6A-8D. In particular, FIGS. 6A and 6B show a simulated FoV of the left lateral LIDAR device 21, seen as a top plan view, at the rail level. In particular, FIG. 6A corresponds to a condition in which this LIDAR device has both the lateral and forward inclinations (in this example, R=45° and S=12°), while FIG. 6B corresponds to a condition in which only the lateral inclination is provided (R=45°, S=0). The effect of the forward inclination (angle S) can be noticed at a first sight: the FoV in FIG. 6A completely covers the whole side of the vehicle, without the blind spots, and better covers the area in front of the bumper; in FIG. 6B (no forward inclination), on the other hand, the LIDAR device will fail to detect potential pedestrians (children, wheelchairs, etc.) just near the driver's cabin, in side and front areas that are difficult to see even for the driver.

Figure 7A:
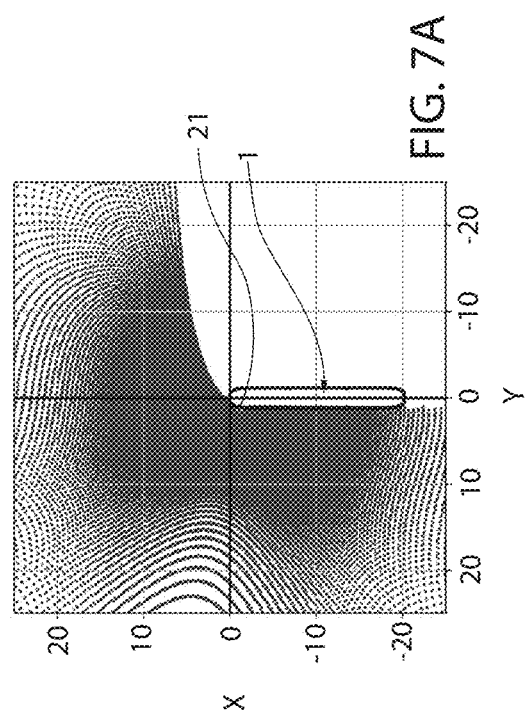
Figure 7B:
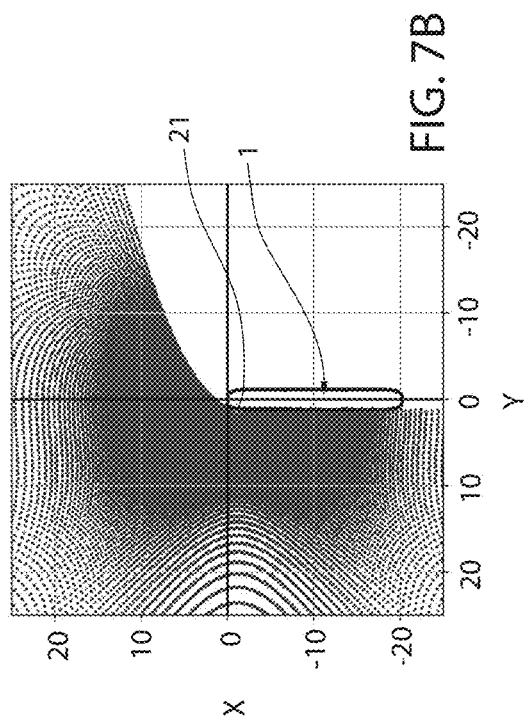

FIGS. 7A and 7B are the same as FIGS. 6A and 6B and show the vehicle as a whole, to confirm that the FoV is wider at the front areas of the vehicle when the forward inclination is provided; in the meantime, the forward inclination does not limit the FOV along the side of the whole vehicle length.

FIGS. 7C and 7D are similar respectively to FIGS. 7A and 7B and show the FoV, scanned by the LIDAR device arranged at the left side, at a height of 2 meters; and FIGS. 7E and 7F are also similar respectively to FIGS. 7A and 7B and show the FoV at a height of 4 meters (corresponding approximately to the height of a catenary).

As the height value increases from Z=0 to Z=4, if the forward inclination is provided (FIGS. 7C and 7E), the FoV is the same as, or wider than, the one achieved without forward inclination (FIGS. 7D and 7F).

Figure 8A:
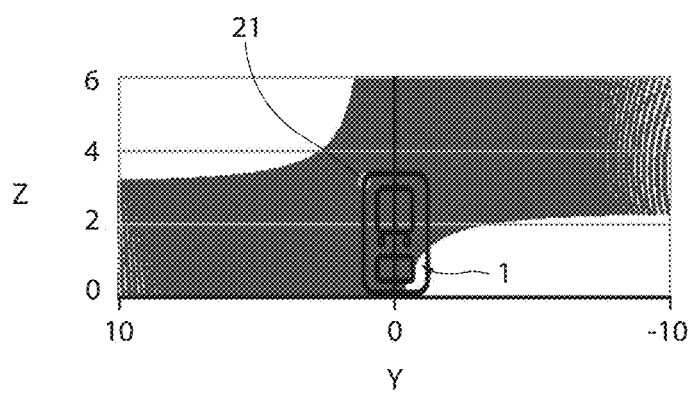
Figure 8B:
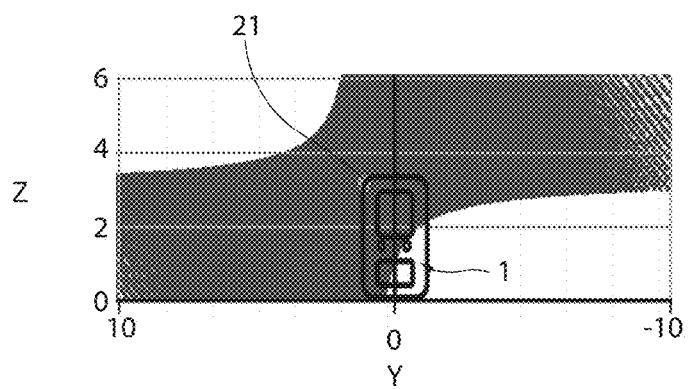
Figure 8C:
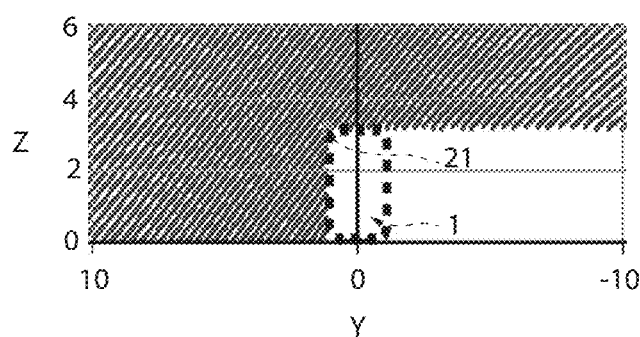
Figure 8D:
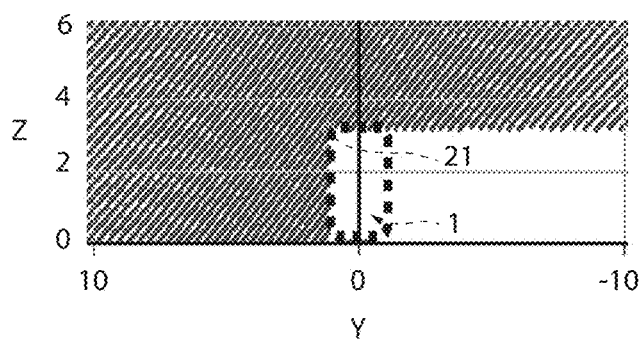

At the same time, notwithstanding the gain in the FoV at the front areas of the vehicle, the forward inclination does not impair the FoV at the rear areas and does not impair the capacity of detecting the catenary (at Z=4 meters). In other words, the forward inclination brings only benefits, without any disadvantage. The same conclusion can be seen in FIG. 8: in particular, FIGS. 8A and 8B show the FoV of the same LIDAR device in a plane YZ arranged ahead of the vehicle, at X=1 meter from the front end of the vehicle (it is possible to notice the gain in terms of FoV achieved by the forward inclination in FIG. 8A, with respect to the condition without forward inclination considered in FIG. 8B); while FIGS. 8C and 8D show the FoV at a rear area, at X=−20 meters, without significant disadvantages when the forward inclination is provided in FIG. 8C with respect to the condition without forward inclination considered in FIG. 8D.

As just mentioned, therefore, the forward inclination or orientation angle (S) allows for improving the detection range of the LIDAR devices 21 and limiting possible blind spots, so as to monitor areas that are relatively close to vehicle 1 and that are usually difficult to view from the cabin and/or difficult to view by usually installed cameras and mirrors, during use.

According to a preferred aspect of the present invention, the point C of the base surfaces 22 is arranged at a height that is lower than a top vertical end point P of the vehicle roof 24. More preferably, the whole LIDAR device 21 is arranged below such top vertical end point P.

In the meantime, in particular, the points C of the base surfaces 22 are arranged relatively high, so as to be far from the ground, and the scanned field is relatively wide. For instance, the position in height of the points C (D1, in FIG. 1) is higher than 3 meters, measured with respect to the vehicle floor or the ground.

According to a further preferred aspect of the present invention, the LIDAR devices 21 are wholly arranged within the body gauge of the vehicle 1. As "body gauge", it is to be intended the geometrical/dimensional limits imposed by the standard EN 15273 for rail vehicles or by any relevant legislation or standard for other kinds of vehicle.

In particular, the points C of the base surfaces 22 are arranged horizontally between the two vertical planes 17 described above, if vehicle 1 is viewed from the front.

In particular, when considering the plane M (FIG. 1), the horizontal distance D2 between each point C and such plane M is higher than 1 meter, and within the body gauge as mentioned above.

In particular, the points C of the base surface 22 are arranged along axis X, within 1 meter from the forward end point of the front portion 8 of the vehicle 1.

The top plan view in FIG. 3 shows marks relative to the detected or scanned FoV of the LIDAR devices 21 around the vehicle 1, with the inclinations or orientation angles described above. In particular, this FoV is detected at an ideal horizontal plane which is located 2 cm above the rail level (and which approximately corresponds to the walking level of the passengers on the ground) and reaches, at the most, a boundary line 30, indicated by a dashed line, which extends near the external profile of vehicle 1. The LIDAR devices 21 have no visibility of the areas between vehicle 1 and this boundary line 30, but these areas are extremely small, thanks to the two inclinations described above for the axes A.

It can also be noted that the rearview mirrors or the cameras, if any, could be an obstacle to detection/scanning by LIDAR devices 21, as they can generate relatively large blind zones 32, where the presence of objects or people cannot be detected. In the shown configuration, the blind zones 32 are located directly underneath the rearview mirrors, next to the cabin and/or at the front corners of the vehicle 1.

In this specific example, the position of the blind zones 32 in FIG. 3 is sometimes relatively critical. In particular, the driver in the cabin is not always capable to directly view into such areas (which are below his driving seat 9), through the windows 11. As a result, there is a risk of hitting any obstacles (even a small person, e.g. a child) and causing an accident. The variant shown in FIG. 4 helps in solving this problem, as the LIDAR devices 21 are positioned longitudinally further forward, with respect to the longitudinal position in FIG. 3, and therefore the blind zones 32a generated in this case are further away from the front bumper than in the previous case, and therefore they could be less critical for driving the vehicle 1. In fact, these zones 32a can be located at passenger boarding areas, which are usually covered by dedicated cameras, e.g. provided at the doors.

Figure 4:
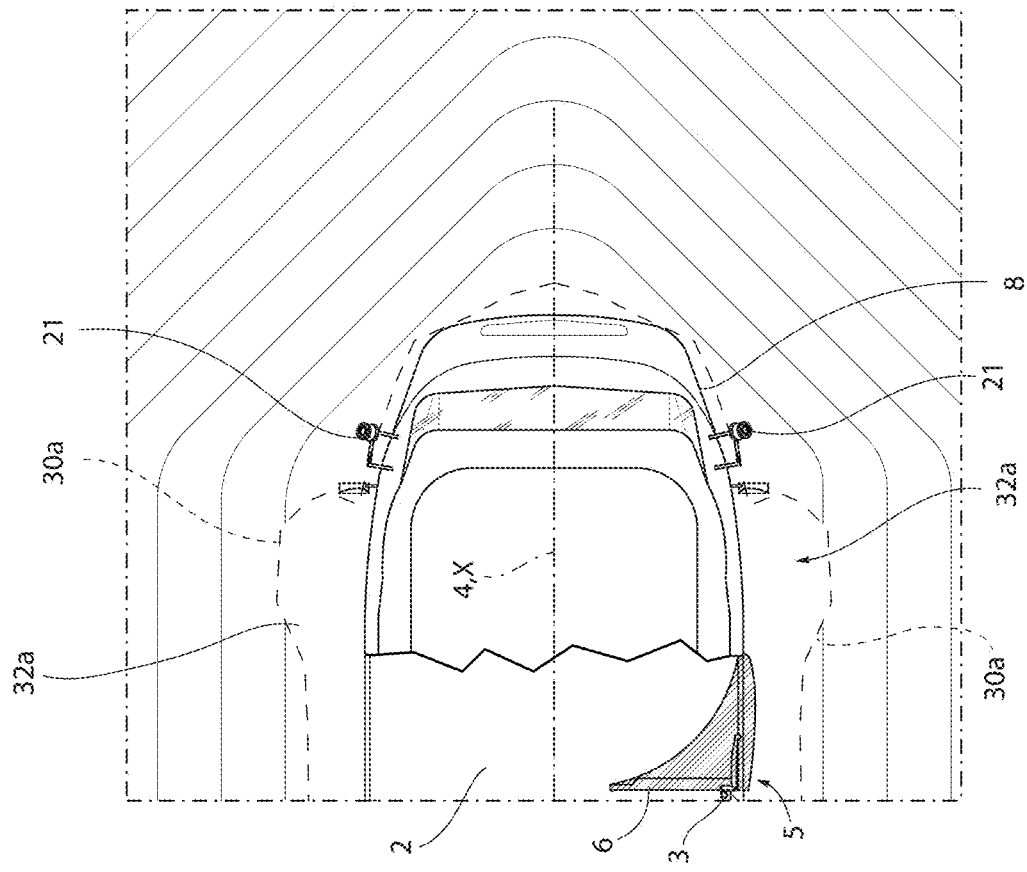
FIG. 4 is similar to FIG. 3 and shows a variant of the vehicle according to the present invention.

At the same time, however, the configuration of FIG. 4 could be worse for other aspects. In fact, the boundary line 30a (FIG. 4) can be further away from the external profile of the side wall 3.

Figure 5:
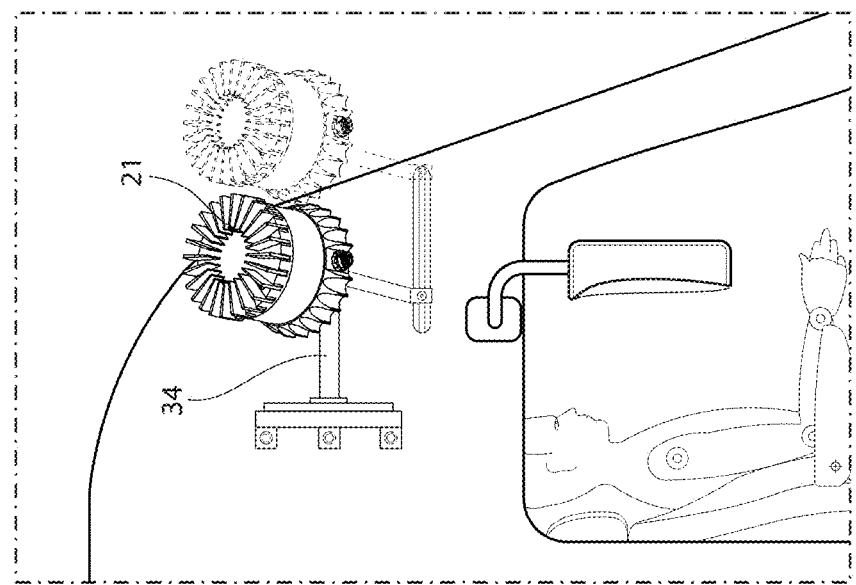
FIG. 5 is similar to FIG. 2 and shows, in an enlarged scale, a further variant of the railway vehicle according to the present invention.

A possible compromise is defined by the solution schematically shown in FIG. 5, wherein the LIDAR devices 21 are longitudinally movable with respect to the bodywork. In other words, its longitudinal position is adjustable. In particular, the movement takes place in response to the activation of an actuator device 34 (schematically illustrated) between a rear position, corresponding to the configuration in FIGS. 1-3, and a forward position (in a dashed line), corresponding to the configuration in FIG. 4. The movement between the two positions along the longitudinal direction could be controlled manually by the driver and/or could be controlled automatically by an appropriate control system according to the driving and/or operating conditions of the vehicle 1 (e.g. according to forward speed, door opening status, etc.).

From the above, it is clear that the particular inclinations or orientation angles of the axes A of the LIDAR devices 21 are extremely advantageous in those vehicles, e.g. public passenger transport vehicles, in which it is necessary to monitor the external areas near the doors 6 and, at the same time, monitor the external areas at the front corners of vehicle 1.

In particular, the proposed arrangement (especially the forward inclination) extends the FoV at rail level, without having disadvantages at the overhead catenary level and at the rear areas, without using additional LIDAR devices.

As mentioned above, in addition to the orientation of the LIDAR devices 21, their positions, and the possibility of their longitudinal adjustment if provided, also contribute to an optimal detection of these areas, with a very limited number of LIDARs.

Finally, it is clear from the foregoing that modifications and variations may be made to the vehicle 1, described above with reference to the attached figures, without departing from the scope of protection of the present invention, as defined in the appended claims.

In particular, as mentioned above, the LIDAR devices 20 could be absent, or only one of them could be provided.

Besides, each of the LIDAR devices 21 could be defined by mounting and combining two or more LIDARs (e.g. two LIDARs each configured to scan 180°, or more LIDARs having a different configuration), so as to achieve the same 360° overall coverage for the FoV about the corresponding axis A. The arrangement of the LIDAR assembly at the front portion 8 could be provided also at the opposite end of the vehicle, so as to monitor both directions if the vehicle is bidirectional.

The invention claimed is:

1. A railway vehicle comprising:
   a roof;
   a passenger compartment for the transportation of passengers;
   two side walls facing each other and defining said passenger compartment;
   a front end portion comprising
      a) a lower front wall carrying a bumper to ensure safety in the event of a front impact against obstacles;
      b) two LIDAR devices, which are arranged at the upper side corners of the front end portion and have respective axes, each extending upwards from a base surface of the respective LIDAR device;
   each of said LIDAR devices being configured to have a field of view of 360° about the respective axis;
   wherein each of said axes has:
      a lateral outward inclination so as to monitor the sides of the railway vehicle, and
         a forward inclination so as to remove possible blind spots at the side ends of the bumper and in front of the bumper
      wherein:
      for each of said axes, the forward inclination has an angle between 0° and 45° measured about a vertical axis and with respect to a vertical plane that is orthogonal to a longitudinal axis of the vehicle;
      for each of said axes, the lateral outward inclination has an angle between 40° and 50° measured with respect to the vertical axis in a plane where said axis and said vertical axis lie;
      each LIDAR device is configured to scan the field of view between an upper boundary and a lower boundary, which form a given scanning angle between each other.

2. The railway vehicle according to claim 1 wherein, for each of said axes, the forward inclination has an angle between 0° and 15° measured about a vertical axis and with respect to a vertical plane that is orthogonal to a longitudinal axis of the vehicle.

3. The railway vehicle according to claim 1, wherein said scanning angle is equal to 90°.

4. The railway vehicle according to claim 1, wherein, for each said LIDAR device, the lower boundary has a directrix line that is substantially coincident with, or parallel to, the vertical axis.

5. The railway vehicle according to claim 1, wherein at least part of each LIDAR device is arranged at a height that is lower than an upper end point of said roof.

6. The railway vehicle according to claim 5, wherein said LIDAR devices are completely arranged within the body gauge of the vehicle.

7. The railway vehicle according to claim 1, wherein at least one portion of each side wall is tangent respectively to an ideal vertical longitudinal plane; and wherein said base surfaces have respective centre points that are arranged horizontally between said ideal vertical longitudinal planes.

8. The railway vehicle according to claim 1, wherein said front end portion comprises actuator means which can be controlled to move said LIDAR devices longitudinally between a forward position and a rear position.

9. The railway vehicle according to claim 1, wherein said front end portion comprises at least one front LIDAR device, which is arranged at said lower front wall and is configured to scan a field of view with an angle lower than 180° about its axis.

10. The railway vehicle according to claim 9, wherein said front end portion comprises two front LIDAR devices arranged so as to have respective fields of view, each rotated outwardly so as to be pointed towards respective opposite sides in front of the vehicle.

* * * * *